D. M. HOLMES.
Cake-Machine.

No. 220,379. Patented Oct. 7, 1879.

WITNESSES:
Henry N. Miller
C. Sedgwick

INVENTOR:
D. M. Holmes
BY Munn & Co
ATTORNEYS.

N. PETERS, PHOTO-LITHOGRAPHER, WASHINGTON, D. C.

UNITED STATES PATENT OFFICE.

DANIEL M. HOLMES, OF ARLINGTON, NEW JERSEY, ASSIGNOR TO LYDIA A. McCOLLUM, OF NEW YORK, N. Y., EXECUTRIX OF JOHN McCOLLUM.

IMPROVEMENT IN CAKE-MACHINES.

Specification forming part of Letters Patent No. 220,379, dated October 7, 1879; application filed March 25, 1879.

*To all whom it may concern:*

Be it known that I, DANIEL M. HOLMES, of Arlington, in the county of Hudson and State of New Jersey, have invented a new and useful Improvement in Cake-Machines, of which the following is a specification.

Figure 1:
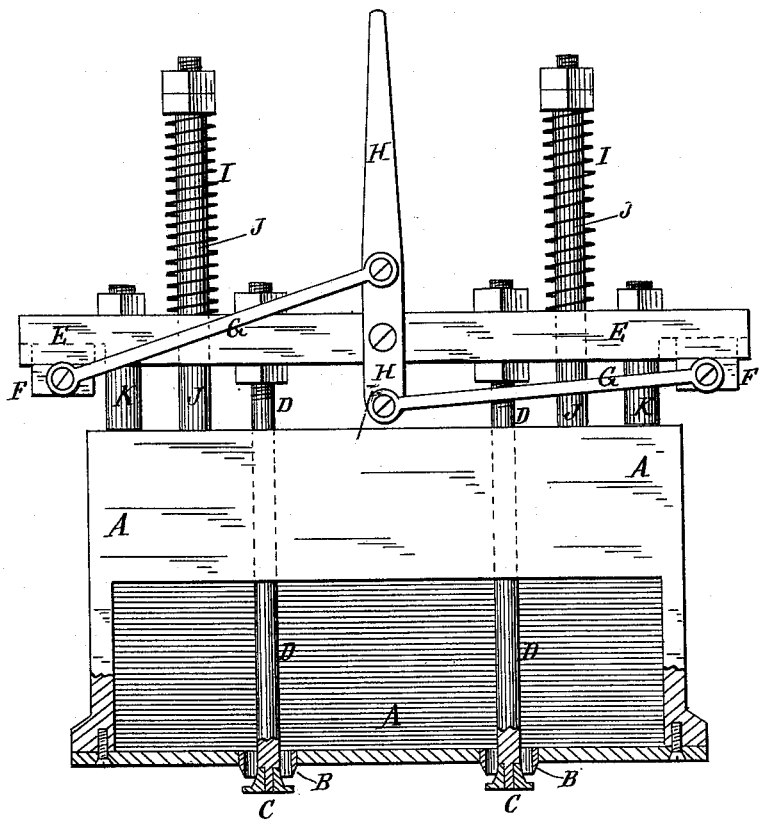
Figure 2:
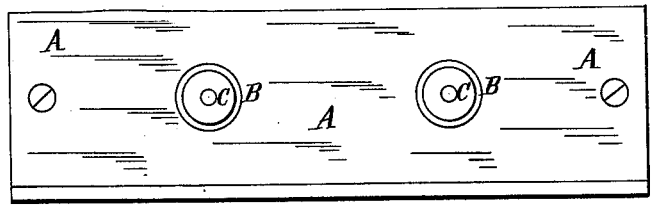

Figure 1 is a rear view of the discharge-compartment of the dough-box of a cake-machine and its attachments, partly in section to show the construction. Fig. 2 is a bottom view of the same.

Similar letters of reference indicate corresponding parts.

The object of this invention is to improve the construction of the cake-machines for which Letters Patent Nos. 174,244 and 188,366 were granted February 29, 1876, and March 13, 1877, respectively, Daniel M. Holmes, inventor.

The invention consists in the combination of the tubular cutters and the conical flanged heads with the bottom of the discharge-compartment of the dough-box, and with the rods, the cross-bar, the rods and springs, and the stop-rods, as hereinafter fully described.

A represents the discharge-compartment of the dough-box of a cake-machine, from which the dough escapes through holes in its bottom.

In the holes in the bottom of the compartment A are secured short tubes B, in such a way that their upper ends may be flush with the inner surface of the said bottom.

The lower ends of the tubes B project a little below the outer surface of the bottom of the compartment A, and are beveled upon the outer sides of their edges, thus forming tubular cutters.

C are conical heads, which are made smaller than the interior of the tubular cutters B, so that the dough may pass out through the said cutters around the said heads.

Around the bases of the conical heads C are formed ring-flanges, of a diameter about equal to the external diameter of the tubular cutters B, so that when the said heads are drawn upward their flanges may pinch off the dough against the edges of the said tubular cutters B.

The sides of the conical heads C from their upper ends to their flanges are slightly concaved, to give the escaping dough such a direction as to cause it to pass out readily through the space between the edges of the tubular cutters B and the flanges of the heads C.

The heads C are secured to the lower ends of the rods D, which pass up through holes in the top of the compartment A and through holes in the cross-bar E, and are secured in place by nuts screwed upon them above and below the said cross-bar E.

The lower sides of the ends of the cross-bar E have dovetailed grooves formed in them to receive the dovetailed upper sides of the sliding blocks F, to the sides of which are pivoted the outer ends of the connecting-rods G.

The inner ends of the connecting-rods G are pivoted to the lever H upon the opposite sides of and equally distant from its pivoting-point.

The lever H is pivoted to the center of the side of the cross-bar E, so that, by operating the lever H, the blocks F may be slid out and in, to throw the cutters into and out of gear with the push-rods, which push-rods are not shown in the drawings.

With this construction the cakes of dough are cut off by the upward movement of the cross-bar E. The cross-bar E is forced down, to allow the dough to again pass out, by the spiral springs I, which are placed upon the rods J.

The lower ends of the spiral springs I rest upon the cross-bar E, and their upper ends rest against nuts screwed upon the upper ends of the said rods J. The rods J pass down through holes in the cross-bar E, and their lower ends are attached to the top of the compartment A.

The downward movement of the heads C is limited by the rods K, the upper ends of which are attached to the cross-bar E, and their lower ends strike against the top of the compartment A.

Having thus described my invention, I claim as new and desire to secure by Letters Patent—

The combination of the tubular cutters B and the conical flanged heads C with the bottom of the compartment A and with the rods D, the cross-bar E, the rods and springs J I, and the stop-rods K, substantially as herein shown and described.

DANIEL M. HOLMES.

Witnesses:
 JAMES T. GRAHAM,
 C. SEDGWICK.